US006966287B1

(12) United States Patent
Livshiz et al.

(10) Patent No.: US 6,966,287 B1
(45) Date of Patent: Nov. 22, 2005

(54) CAM PHASER AND DOD COORDINATION FOR ENGINE TORQUE CONTROL

(75) Inventors: Michael Livshiz, Ann Arbor, MI (US);
Jeffrey M. Kaiser, Highland, MI (US);
Richard H. Clutz, Howell, MI (US);
Donovan L. Dibble, Utica, MI (US);
Bahram Younessi, Farmington, MI (US); Gregory J. York, Fenton, MI (US); Kevin J. Storch, Brighton, MI (US); Timothy J. Braman, Williamston, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/001,709

(22) Filed: Dec. 1, 2004

(51) Int. Cl.$^7$ .................................................. F01L 1/34

(52) U.S. Cl. ............................... 123/90.15; 123/90.17; 123/399

(58) Field of Search .......................... 123/90.15, 90.16, 123/90.17, 90.18, 90.27, 90.31, 399, 352, 123/361; 701/101, 102

(56) References Cited

U.S. PATENT DOCUMENTS

| 6,250,283 | B1 * | 6/2001 | Russell et al. ............... 123/361 |
| 6,704,638 | B2 | 3/2004 | Livshiz et al. |
| 6,817,336 | B2 * | 11/2004 | Glugla et al. ............ 123/198 F |

* cited by examiner

*Primary Examiner*—Thomas Denion
*Assistant Examiner*—Ching Chang
(74) *Attorney, Agent, or Firm*—Christopher DeVries

(57) ABSTRACT

A torque control system for regulating operation of a displacement on demand engine that is operable in an activated mode and a deactivated mode includes a throttle that regulates air flow into the engine and a cam phaser that regulates a torque output of the engine. A first module determines a throttle area based on a desired deactivated manifold absolute pressure (MAP) and a desired mass air flow (MAF) and a second module determines a desired cam phaser position based on an engine speed and a transitional air per cylinder (APC) that is determined based on one of a desired deactivated APC and desired activated APC. A third module generates a throttle control signal to control the throttle based on the throttle area and a fourth module generates a cam phaser control signal to control the cam phaser based on the desired cam phaser position.

31 Claims, 4 Drawing Sheets

CAM PHASER AND DOD COORDINATION FOR ENGINE TORQUE CONTROL

FIELD OF THE INVENTION

The present invention relates to engine control systems, and more particularly to coordinating camshaft control in a displacement on demand (DOD) engine.

BACKGROUND OF THE INVENTION

Internal combustion engines combust an air and fuel mixture within cylinders to drive pistons, which produces drive torque. Air flow into the engine is regulated via a throttle. More specifically, the throttle adjusts a throttle area, which increases or decreases air flow into the engine. As the throttle area increases, the air flow into the engine increases. A fuel control system adjusts a fuel injection system to provide a desired air/fuel mixture to the cylinders. As can be appreciated, increasing the air and fuel to the cylinders increases the torque output of the engine.

Some internal combustion engines include engine control systems that deactivate cylinders under specific low load operating conditions. For example, an eight cylinder engine can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders of the engine (one or more cylinders not active). In the deactivated mode, there are fewer firing cylinders. As a result, there is less drive torque available to drive the vehicle driveline and accessories (e.g., alternator, coolant pump, A/C compressor). Engine efficiency, however, is increased as a result of decreased air pumping losses due to the deactivated cylinders not taking in and compressing fresh intake air.

Engine control systems have been developed to accurately control engine torque output to achieve a desired torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY OF THE INVENTION

Accordingly, the present invention provides a torque control system for regulating operation of a displacement on demand engine that is operable in an activated mode and a deactivated mode. The torque control system includes a throttle that regulates air flow into the engine and a cam phaser that regulates a torque output of the engine. A first module determines a throttle area based on a desired deactivated manifold absolute pressure (MAP) and a desired mass air flow (MAF) and a second module determines a desired cam phaser position based on an engine speed and a transitional air per cylinder (APC) that is determined based on one of a desired deactivated APC and a desired activated APC. A third module generates a throttle control signal to control the throttle based on the throttle area and a fourth module generates a cam phaser control signal to control the cam phaser based on the desired cam phaser position.

In another feature, the cam phaser includes an intake cam phaser that regulates a phase angle of an intake cam shaft relative to a rotational position of the engine.

In another feature, the cam phaser includes an exhaust cam phaser that regulates a phase angle of an exhaust cam shaft relative to a rotational position of the engine.

In another feature, the torque control system further includes a fifth module that determines the desired deactivated MAP based on the engine speed, a DOD mode and a torque request.

In another feature, the torque control system further includes a fifth module that determines the desired MAF based on the desired deactivated APC.

In still another feature, the torque control system further includes a fifth module that determines the desired deactivated APC based on the torque request and the DOD mode.

In yet other features, the desired deactivated APC is corrected based on an APC correction factor. The APC correction factor is determined based on a torque request and a torque estimate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
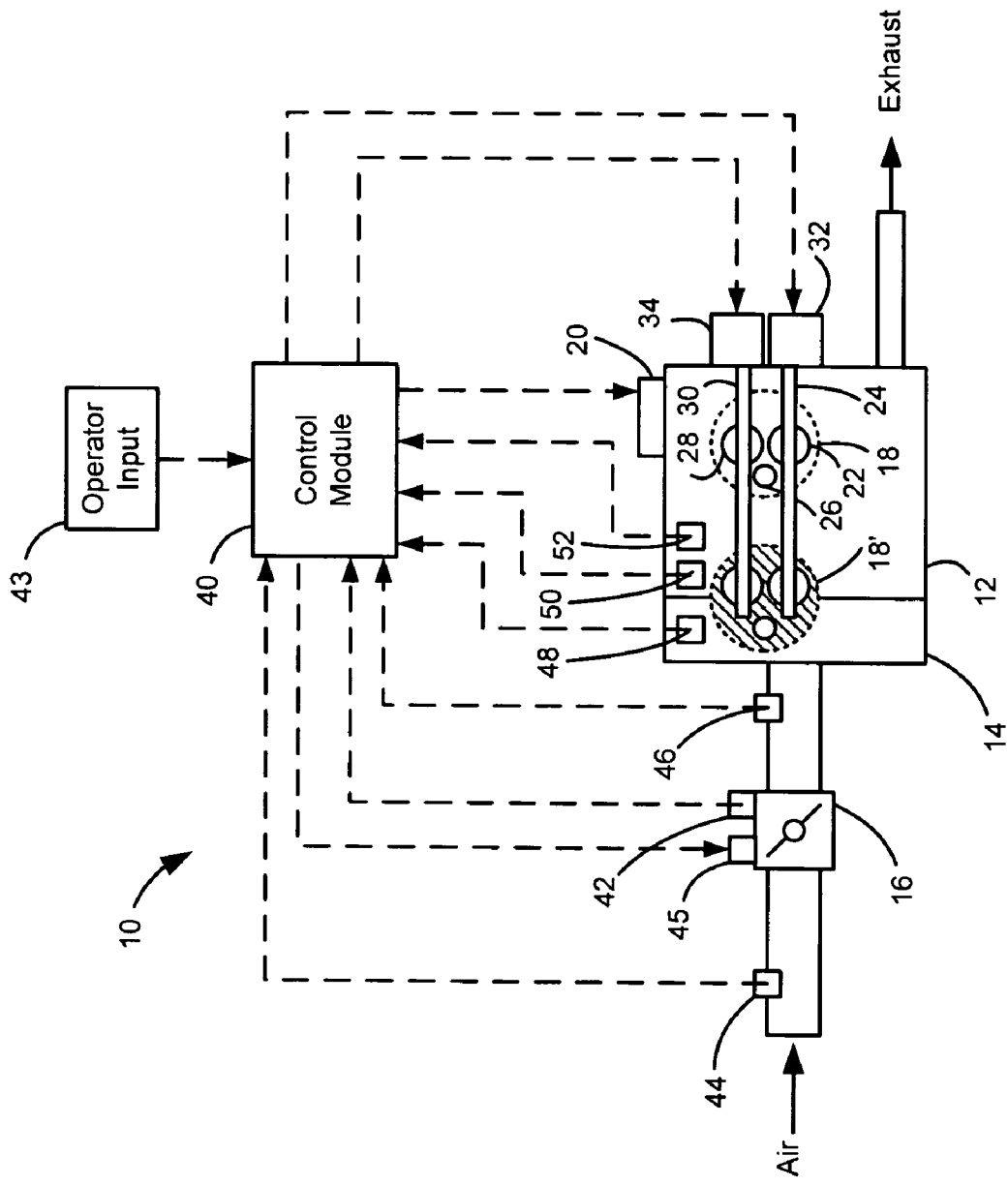
FIG. 1 is a schematic illustration of an exemplary torque control system for an engine according to the present invention.

The following description of the preferred embodiments is merely exemplary in nature and is in no way intended to limit the invention, its application, or uses. For purposes of clarity, the same reference numbers will be used in the drawings to identify similar elements. As used herein, an activated mode refers to operation of the engine using all of the engine cylinders. A deactivated mode refers to operation of the engine using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although two cylinders 18 are illustrated, it can be appreciated that the coordinated torque control system of the present invention can be implemented in engines having a plurality of cylinders including, but not limited to, 3, 4, 5, 6, 8, 10 and 12 cylinders.

A fuel injector (not shown) injects fuel that is combined with the air as it is drawn into the cylinder 18 through an intake port. The fuel injector may be an injector associated with an electronic or mechanical fuel injection system 20, a jet or port of a carburetor or another system for mixing fuel with intake air. The fuel injector is controlled to provide a desired air-to-fuel (A/F) ratio within each cylinder 18.

An intake valve 22 selectively opens and closes to enable the air/fuel mixture to enter the cylinder 18. The intake valve position is regulated by an intake cam shaft 24. A piston (not shown) compresses the air/fuel mixture within the cylinder 18. A spark plug 26 initiates combustion of the air/fuel mixture, which drives the piston in the cylinder 18. The piston, in turn, drives a crankshaft (not shown) to produce drive torque. Combustion exhaust within the cylinder 18 is forced out an exhaust port when an exhaust valve 28 is in an open position. The exhaust valve position is regulated by an exhaust cam shaft 30. The exhaust is treated in an exhaust system and is released to atmosphere. Although single intake and exhaust valves 22,28 are illustrated, it can be appreciated that the engine 12 can include multiple intake and exhaust valves 22,28 per cylinder 18.

The engine system 10 includes an intake cam phaser 32 and an exhaust cam phaser 34 that respectively regulate the rotational timing of the intake and exhaust cam shafts 24,30. More specifically, the timing or phase angle of the respective intake and exhaust cam shafts 24,30 can be retarded or advanced with respect to each other or with respect to a location of the piston within the cylinder 18 or crankshaft position. In this manner, the position of the intake and exhaust valves 22,28 can be regulated with respect to each other or with respect to a location of the piston within the cylinder 18. By regulating the position of the intake valve 22 and the exhaust valve 28, the quantity of air/fuel mixture ingested into the cylinder 18 and therefore the engine torque is regulated.

One or more select cylinders 18' are selectively deactivated during engine operation. When the engine 12 enters an operating point to enable the deactivated mode, the control module transitions the engine 12 to the deactivated mode. In an exemplary embodiment, N/2 cylinders 18 are deactivated, although one or more cylinders may be deactivated. Upon deactivation of the select cylinders 18', the control module increases the power output of the remaining or activated cylinders 18. The inlet and exhaust ports of the deactivated cylinders 18' are closed to reduce pumping losses. The engine load is determined based on the intake MAP, cylinder mode and engine speed. More particularly, if the MAP is below a threshold level for a given RPM, the engine load is deemed light and the engine 12 can be operated in the deactivated mode. If the MAP is above the threshold level for the given RPM, the engine load is deemed heavy and the engine 12 is operated in the activated mode. The control module transitions the engine 12 between the activated mode and deactivated mode based on the engine load.

A control module 40 operates the engine based on the engine torque control approach according to the present invention. More specifically, the control module 40 generates a throttle control signal based on an engine torque request ($T_{REQ}$) and a throttle position signal generated by a throttle position sensor (TPS) 42. $T_{REQ}$ is generated based on an operator input 43 such as an accelerator pedal position. The control module 40 commands the throttle 16 to a steady-state position to achieve an effective throttle area ($A_{THR}$). A throttle actuator 45 adjusts the throttle position based on the throttle control signal. The throttle actuator can include a motor or a stepper motor, which provides limited and/or coarse control of the throttle position.

The control module 40 also regulates the fuel injection system 20 and the cam shaft phasers 32,34 to achieve $T_{REQ}$. More specifically, the control module 40 generates cam phaser control signals based on a desired air per cylinder (APC) in the deactivated mode, a desired APC in the activated mode and a mode signal, as discussed in further detail below.

An intake air temperature (IAT) sensor 44 is responsive to a temperature of the intake air flow and generates an intake air temperature signal. A mass airflow (MAF) sensor 46 is responsive to the mass of the intake air flow and generates a MAF signal. A manifold absolute pressure (MAP) sensor 48 is responsive to the pressure within the intake manifold 14 and generates a MAP signal. An engine coolant temperature sensor 50 is responsive to a coolant temperature and generates an engine temperature signal. An engine speed sensor 52 is responsive to a rotational speed (i.e., RPM) of the engine 12 and generates in an engine speed signal. Each of the signals generated by the sensors are received by the control module 40.

The engine torque control system of the present invention regulates engine torque output based on $A_{THR}$ and the activated/deactivated mode of the engine 12. $A_{THR}$ is determined based on a desired manifold air flow ($MAF_{DES}$) and a desired deactivated manifold absolute pressure ($MAP_{DES\_DEACT}$). $MAP_{DES\_DEACT}$ indicates the desired MAP when operating in the deactivated mode. $MAF_{DES}$ is determined based on a desired deactivated air-per-cylinder ($APC_{DES\_DEACT}$) and is characterized by the following relationships:

$$APC_{DES\_DEACT} = T_{APC\_DEACT}^{-1}(T_{REQ}, S, I, E, AF, OT, N);$$
and $$MAF_{DES} = \frac{APC_{DES\_DEACT} \cdot R}{k_{CYL}}$$

where:

S is the ignition spark timing;

I is the intake cam phase angle;

E is the exhaust cam phase angle;

AF is the air/fuel ratio;

OT is the oil temperature;

N is the number of cylinders; and $k_{CYL}$ is a conversion factor (e.g., $k_{CYL}$=15 for 8 cylinder engine).

$MAP_{DES\_DEACT}$ is determined based on RPM and $T_{REQ}$ and is characterized by the following equation:

$$MAP_{DES\_DEACT} T_{MAP\_DEACT}^{-1}((T_{REQ}+f(\Delta T)), S, I, E, AF, OT, N)$$

where $\Delta T$ is the difference between first and second torque estimations. The calculation of $MAF_{DES}$, $APC_{DES\_DEACT}$ and $MAP_{DES\_DEACT}$ is similar to that disclosed in commonly assigned U.S. patent application Ser. No. 10/664,172, filed Sep. 17, 2003, the disclosure of which is expressly incorporated herein by reference in its entirety.

The engine torque control system also generates cam phaser control signals based on $APC_{DES\_DEACT}$ and a desired activated APC ($APC_{DES\_ACT}$). $APC_{DES\_ACT}$ is determined based on an accelerator pedal position (PP) and engine speed (RPM).

Figure 2:
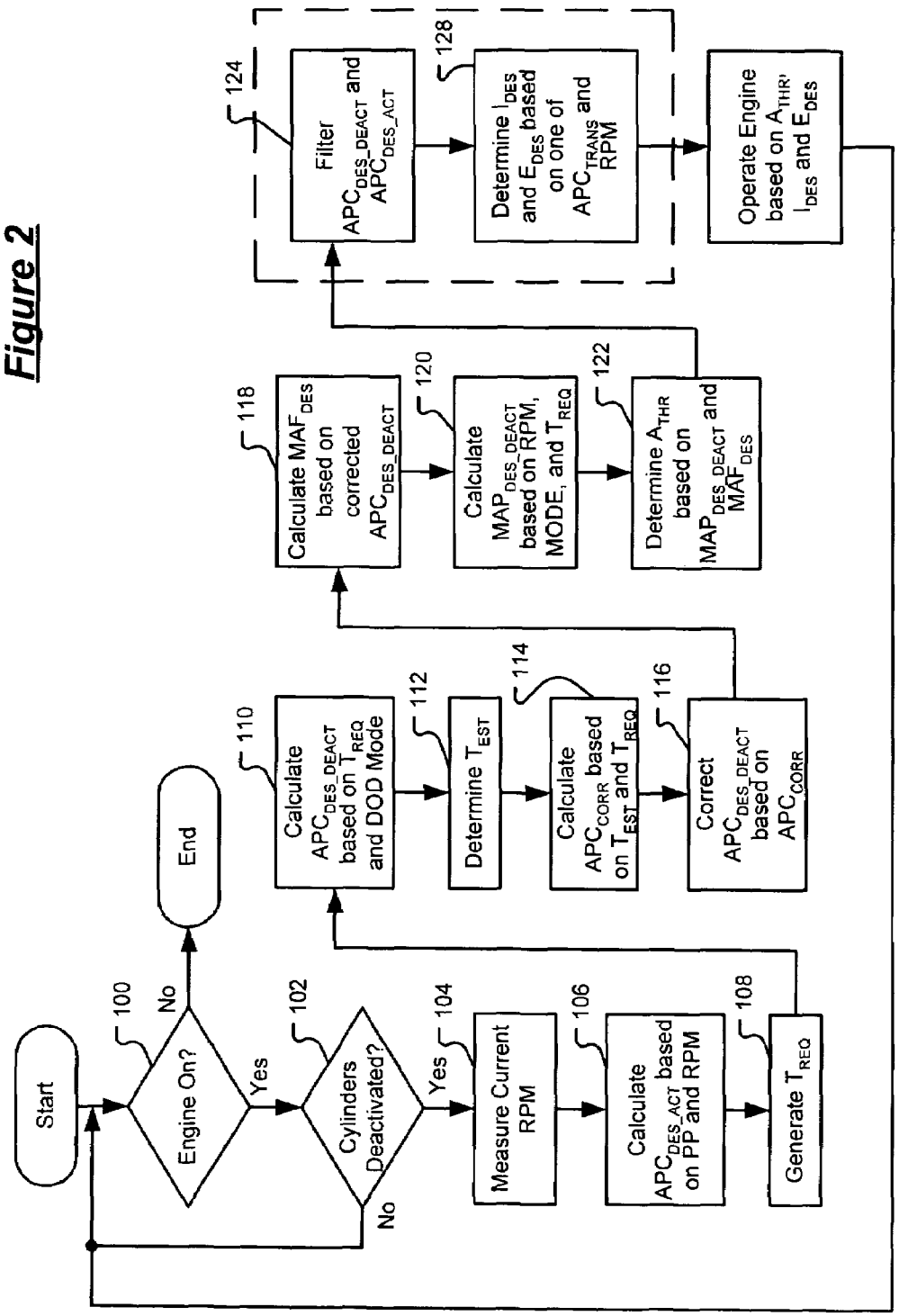
FIG. 2 is a flowchart illustrating steps executed by the torque control system of the present invention.

Referring now to FIG. 2, the engine torque control system will be described in further detail. In step 100, control determines whether the engine is running. If the engine is not running, control ends. If the engine is running, control determines whether the engine 12 is operating in the deactivated mode in step 102. If the engine is not in the deactivated mode, control returns to step 100.

If the engine is in the deactivated mode, control measures the current engine speed (RPM) in step 104. In step 106, control calculates the desired activated air-per-cylinder ($APC_{DES\_ACT}$) based on pedal position (PP) and RPM measurements and a calibrated look up table. $APC_{DES\_ACT}$ is characterized by the following equation:

$$APC_{DES\_ACT} = f(PP, RPM)$$

In step 108, control generates a torque request ($T_{REQ}$). $T_{REQ}$ is based on $APC_{DES\_ACT}$ and a dilution estimate using a steady-state torque estimator, as discussed in detail in commonly assigned U.S. Pat. No. 6,704,638, issued Mar. 9, 2004, the disclosure of which is expressly incorporated herein by reference. $T_{REQ}$ is characterized by the following equation:

$$T_{REQ} = T_{APC\_ACT}(APC_{DES\_ACT}, S, I, E, AF, OT, N)$$

In step 110, control calculates the desired deactivated air per cylinder ($APC_{DES\_DEACT}$) based on $T_{REQ}$ and the current DOD mode (i.e., activated, deactivated). $APC_{DES\_DEACT}$ is based on an inverse torque model and may be characterized by the following equation:

$$APC_{DES\_DEACT} = T_{APC\_DEACT}^{-1}(T_{REQ}, S, I, E, AF, OT, N)$$

In step 112, control generates a torque estimation ($T_{EST}$) based on feedback from current engine control signals. In step 114, control calculates an air per cylinder correction ($APC_{CORR}$) based on $T_{REQ}$ and $T_{EST}$. In step 116, control corrects the $APC_{DES\_DEACT}$ based on a correction factor ($APC_{CORR}$). $APC_{CORR}$ is based on $T_{REQ}$ and $T_{EST}$. In step 118, control calculates desired mass air flow ($MAF_{DES}$) based on the corrected $APC_{DES\_DEACT}$. $MAF_{DES}$ may be characterized by the following equation:

$$MAF_{DES} = \frac{APC_{DES\_DEACT} \cdot R}{k_{CYL}}$$

In step 120, control calculates the desired deactivated manifold absolute pressure ($MAP_{DES\_DEACT}$) based on RPM, the DOD mode, and $T_{REQ}$. $MAP_{DES\_DEACT}$ may be characterized by the following equation:

$$MAP_{DES\_DEACT} = T_{MAP\_DEACT}^{-1}((T_{REQ} + f(\Delta T)), S, I, E, AF, OT, N)$$

where $\Delta T$ is a filtered difference between deactivated MAP and APC based torque estimators. In step 122, control determines $A_{THR}$ based on $MAP_{DES\_DEACT}$ and $MAF_{DES}$. $A_{THR}$ may be characterized by the following equation:

$$A_{THR} = \frac{MAF_{DES} * \sqrt{R_{GAS} * T}}{B * \Phi\left(\frac{MAP_{DES\_DEACT}}{B}\right)}$$

where B is barometric pressure and $R_{GAS}$ is the ideal gas constant.

In step 124, control filters $APC_{DES\_ACT}$ and $APC_{DES\_DEACT}$ using a low-pass filter. In step 128, control determines a desired intake cam phaser position ($I_{DES}$) and/or a desired exhaust cam phaser position ($E_{DES}$) based on a transitional APC ($APC_{TRANS}$) and RPM. In step 130, control operates engine based on $A_{THR}$, $I_{DES}$ and $E_{DES}$. $APC_{TRANS}$ is determined based on the DOD mode, $APC_{DES\_ACT}$ and $APC_{DES\_DEACT}$ according to the following relationships:

$APC_{TRANS} = APC_{DES\_ACT} \cdot K$ when transitioning from activated to deactivated; and $APC_{TRANS} = APC_{DES\_DEACT} + S$ when transitioning from deactivated to activated. K is a transition variable and S is a step that enables ramping of the APC from $APC_{DES\_DEACT}$ to $APC_{DES\_ACT}$. S is equal to zero when $APC_{TRANS}$ is equal to $APC_{DES\_ACT}$ and S is equal to an increment ($\Delta$) when $APC_{TRANS}$ is greater than $APC_{DES\_ACT}$.

Figure 3:
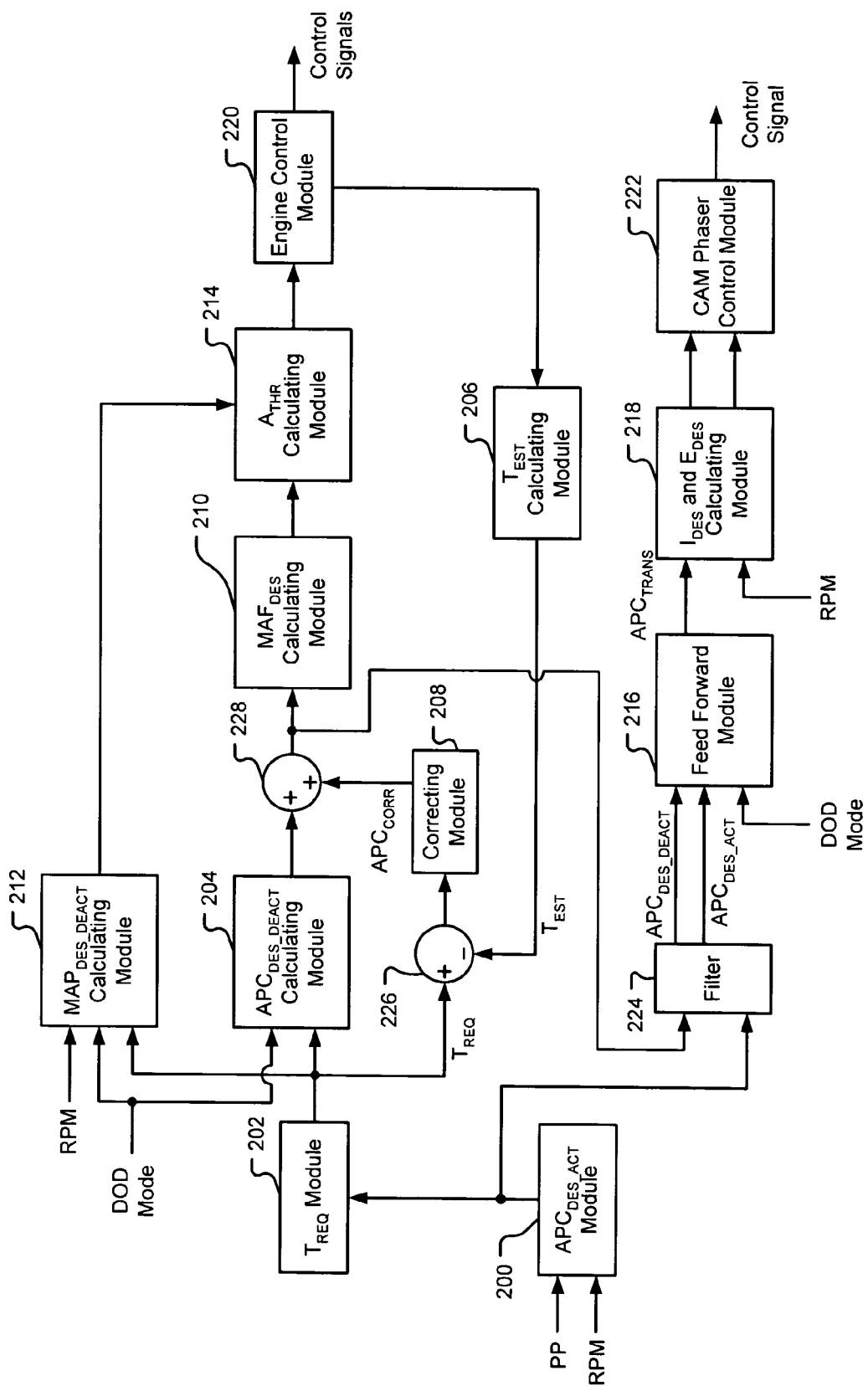
FIG. 3 is a block diagram illustrating modules that provide torque control according to the present invention.

Referring now to FIG. 3, exemplary modules that execute the engine torque control will be discussed in detail. The modules include an $APC_{DES\_ACT}$ module 200, a $T_{REQ}$ module 202, an $APC_{DES\_DEACT}$ calculating module 204, a $T_{EST}$ calculating module 206, a correcting module 208, a $MAF_{DES}$ calculating module 210, a $MAP_{DES\_DEACT}$ calculating module 212, an $APC_{THR}$ calculating module 214, a feed-forward module 216, an $I_{DES}$ and/or an $E_{DES}$ calculating module 218, an engine control module 220 and a cam phaser control module 222.

The $APC_{DES\_ACT}$ module 200 determines $APC_{DES\_ACT}$ based on RPM and PP. $APC_{DES\_ACT}$ is provided to the $T_{REQ}$ module 202 and to the feedforward module 216 through a filter 224 (e.g., low-pass filter). The $T_{REQ}$ module 202 calculates $T_{REQ}$ and provides $T_{REQ}$ to a summer 226 the $APC_{DES\_DEACT}$ calculating module 204, and the $MAP_{DES\_DEACT}$ calculating module 212.

The $APC_{DES\_DEACT}$ calculating module 204 calculates $APC_{DES\_DEACT}$ based on $T_{REQ}$ and the DOD mode and provides $APC_{DES\_DEACT}$ to a summer 228. The $T_{EST}$ calculating module 206 calculates $T_{EST}$ and provides $T_{EST}$ to the summer 226. The summer 226 provides a difference between $T_{REQ}$ and $T_{EST}$, which is provided to the correcting module 208. $APC_{CORR}$ is determined by the correcting module 208 and is provided to the summer 228. The summer 228 corrects $APC_{DES\_DEACT}$ based on the sum of $APC_{DES\_DEACT}$ and $APC_{CORR}$. The corrected $APC_{DES\_DEACT}$ is provided to the $MAF_{DES}$ calculating module 210 and to the feed-forward module 216 through the filter 224.

The $MAF_{DES}$ calculating module 210 calculates $MAF_{DES}$ based on the corrected $APC_{DES\_DEACT}$ and provides $MAF_{DES}$ to the $A_{THR}$ calculating module 214. The $MAP_{DES\_DEACT}$ calculating module 212 calculates $MAP_{DES\_DEACT}$ based on RPM, the DOD mode, and $T_{REQ}$, and provides $MAP_{DES\_DEACT}$ to the $A_{THR}$ calculating module 214. The $A_{THR}$ calculating module 214 calculates $A_{THR}$ based on $MAF_{DES}$ and $MAP_{DES\_DEACT}$ and provides $A_{THR}$ to the engine control module 220. The engine control module 200 generates control signals based thereon.

The feed-forward module 216 determines $APC_{TRANS}$ based on $APC_{DES\_DEACT}$, $APC_{DES\_ACT}$ and the DOD mode. $APC_{TRANS}$ is provided to the $I_{DES}$ and $E_{DES}$ calculating module 218. The $I_{DES}$ and $E_{DES}$ calculating module 218 calculates $I_{DES}$ and $E_{DES}$ based on RPM and $APC_{TRANS}$. The $I_{DES}$ and $E_{DES}$ calculating module 218 provide $I_{DES}$ and $E_{DES}$ to the cam phaser control module 222, which generates control signals based thereon.

Figure 4:
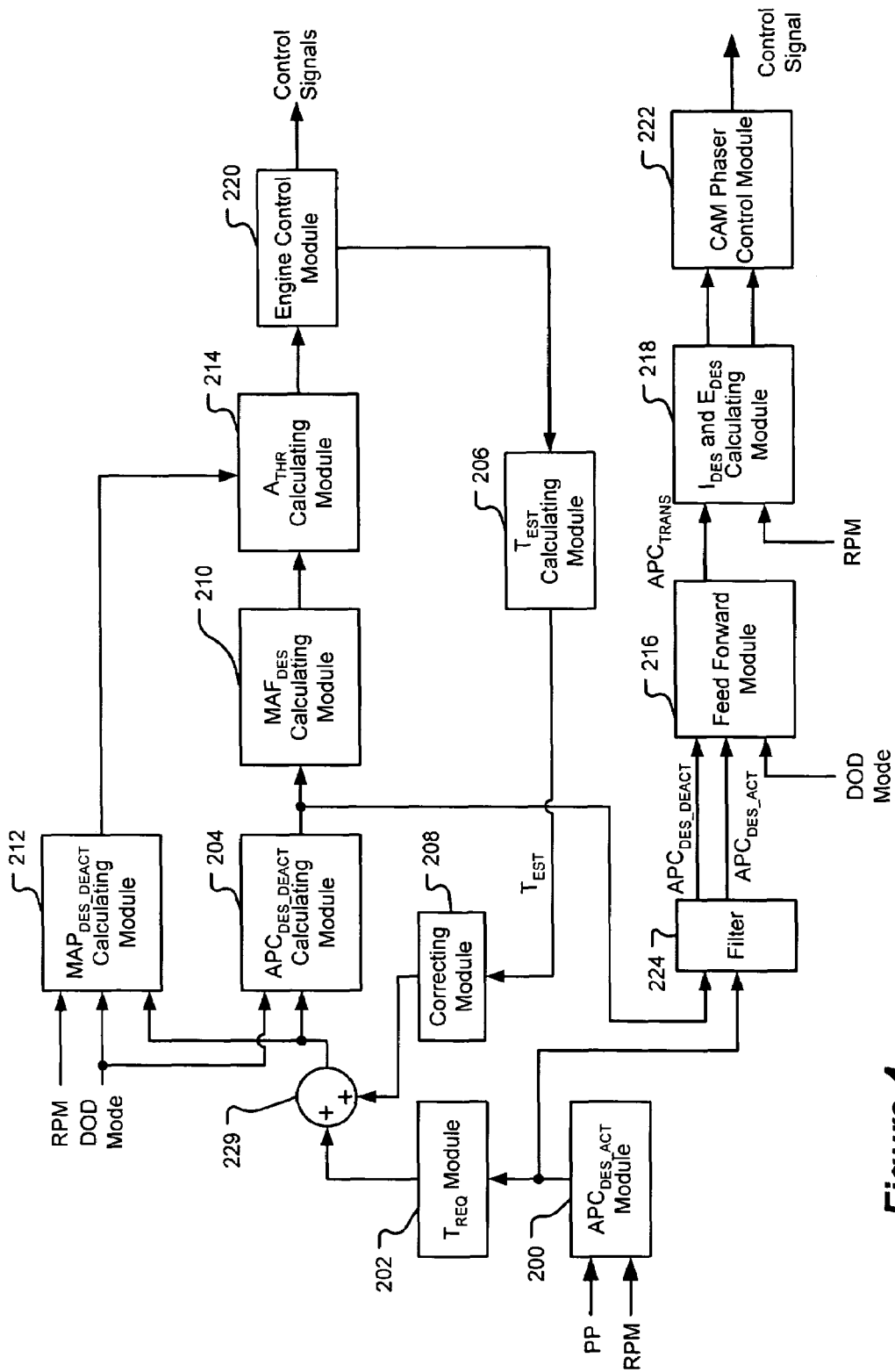
FIG. 4 is a block diagram illustrating an alternative arrangement of the modules of FIG. 3 that provide torque control according to the present invention.

Referring now to FIG. 4, an alternative arrangement of the exemplary modules of FIG. 3 is illustrated. The alternative arrangement corrects $T_{REQ}$ based on $T_{EST}$. More specifically, the correcting module 208 determines a torque correction factor ($T_{CORR}$) based on $T_{EST}$. A summer 229 provides a corrected $T_{REQ}$ based on $T_{REQ}$ and $T_{CORR}$. The corrected $T_{REQ}$ is provided to the $MAP_{DES\_DEACT}$ calculating module 212 and the $APC_{DES\_DEACT}$ calculating module 204. In this manner, $APC_{DES\_DEACT}$ from the $APC_{DES\_DEACT}$ calculating module 204 is provided directly to the $MAF_{DES}$ calculating module 210 without correction. The remainder of the modules function as described above with respect to FIG. 3.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A torque control system for regulating operation of a displacement on demand engine that is operable in an activated mode and a deactivated mode, comprising:
   a throttle that regulates air flow into said engine;
   a cam phaser that regulates a torque output of said engine;
   a first module that determines a throttle area based on a desired deactivated manifold absolute pressure (MAP) and a desired mass air flow (MAF);
   a second module that determines a desired cam phaser position based on an engine speed and a transitional air per cylinder (APC) that is determined based on one of a desired deactivated APC and a desired activated APC;
   a third module that generates a throttle control signal to control said throttle based on said throttle area; and
   a fourth module that generates a cam phaser control signal to control said cam phaser based on said desired cam phaser position.

2. The torque control system of claim 1 wherein said cam phaser includes an intake cam phaser that regulates a phase angle of an intake cam shaft relative to a rotational position of said engine.

3. The torque control system of claim 1 wherein said cam phaser includes an exhaust cam phaser that regulates a phase angle of an exhaust cam shaft relative to a rotational position of said engine.

4. The torque control system of claim 1 further comprising a fifth module that determines said desired deactivated MAP based on said engine speed, a DOD mode and a torque request.

5. The torque control system of claim 1 further comprising a fifth module that determines said desired MAF based on said desired deactivated APC.

6. The torque control system of claim 1 further comprising a fifth module that determines said desired deactivated APC based on said torque request and said mode.

7. The torque control system of claim 1 wherein said desired deactivated APC is corrected based on an APC correction factor.

8. The torque control system of claim 7 wherein said APC correction factor is determined based on a torque request and a torque estimate.

9. A method of regulating torque output of a displacement on demand engine that is operable in an activated mode and a deactivated mode, comprising:
   determining a throttle area based on a deactivated desired manifold absolute pressure (MAP) and a desired mass air flow (MAF);
   determining a desired cam phaser position based on an engine speed and a transitional air per cylinder (APC) that is determined based on one of a desired deactivated APC and desired activated APC;
   generating a throttle control signal based on said throttle area;
   generating a cam phaser control signal based on said desired cam phaser position;
   regulating a throttle based on said throttle control signal to adjust air flow into said engine; and
   regulating a cam phaser based on said cam phaser control signal to adjust a torque output of said engine.

10. The method of claim 9 wherein said cam phaser includes an intake cam phaser that regulates a phase angle of an intake cam shaft relative to a rotational position of said engine.

11. The method of claim 9 wherein said cam phaser includes an exhaust cam phaser that regulates a phase angle of an exhaust cam shaft relative to a rotational position of said engine.

12. The method of claim 9 further comprising determining said desired deactivated MAP based on said engine speed, a DOD mode and a torque request.

13. The method of claim 9 further comprising determining said desired MAF based on said deactivated desired APC.

14. The method of claim 9 further comprising determining said desired deactivated APC based on said torque request and said MODE.

15. The method of claim 9 wherein said desired deactivated APC is corrected based on an APC correction factor.

16. The method of claim 15 wherein said APC correction factor is determined based on a torque request and a torque estimate.

17. A torque control system for regulating operation of a displacement on demand engine that is operable in an activated mode and a deactivated mode, comprising:
   a throttle that regulates air flow into said engine;
   a cam phaser that regulates a torque output of said engine; and
   a control module that determines a throttle area based on a deactivated desired manifold absolute pressure MAP and a desired manifold air flow (MAF), that determines a desired cam phaser position based on an engine speed and a transitional air per cylinder (APC) that is determined based on one of a desired deactivated APC and a desired activated APC, that generates a throttle control signal to control said throttle based on said throttle area and that generates a cam phaser control signal to control said cam phaser based on said cam phaser position.

18. The torque control system of claim 17 wherein said cam phaser includes an intake cam phaser that regulates a phase angle of an intake cam shaft relative to a rotational position of said engine.

19. The torque control system of claim 17 wherein said cam phaser includes an exhaust cam phaser that regulates a phase angle of an exhaust cam shaft relative to a rotational position of said engine.

20. The torque control system of claim 17 wherein said control module determines said desired deactivated MAP based on said engine speed, a DOD mode and a torque request.

21. The torque control system of claim 17 wherein said control module determines said desired MAF based on said desired deactivated $APC_{ACT}$.

22. The torque control system of claim 17 wherein said control module determines said desired deactivated APC based on said torque request and said DOD mode.

23. The torque control system of claim 17 wherein said desired deactivated APC is corrected based on an APC correction factor.

24. The torque control system of claim 23 wherein said APC correction factor is determined based on a torque request and a torque estimate.

25. A method of regulating a torque output of a displacement on demand engine that is operable in an activated mode and a deactivated mode, comprising:
- determining a throttle area based on a desired deactivated manifold absolute pressure (MAP) and a desired manifold air flow (MAF);
- determining a desired intake cam phaser position ($I_{DES}$) and a desired exhaust cam phaser position ($E_{DES}$) based on an engine speed and a transitional air per cylinder (APC) that is determined based on one of a desired activated APC and a desired deactivated APC;
- generating a throttle control signal based on said throttle area;
- generating a cam phaser control signals based on $I_{DES}$ and $E_{DES}$;
- regulating a throttle based on said throttle control signal to adjust air flow into said engine regulating an intake cam phaser based on said cam phaser control signals to adjust said torque output of said engine; and
- regulating an exhaust cam phaser based on said cam phaser control signals to adjust said torque output of said engine.

26. The method of claim 25 wherein said intake and exhaust cam phasers respectively regulates phase angles of intake and exhaust cam shafts relative to a rotational position of said engine.

27. The method of claim 25 further comprising determining said desired deactivated MAP based on said engine speed, a DOD mode and a torque request.

28. The method of claim 25 further comprising determining said desired MAF based on said deactivated desired APC.

29. The method of claim 25 further comprising determining said desired deactivated APC based on said torque request and said MODE.

30. The method of claim 25 wherein said desired deactivated APC is corrected based on an APC correction factor.

31. The method of claim 30 wherein said APC correction factor is determined based on a torque request and a torque estimate.

* * * * *